US008561575B2

(12) United States Patent
Ruffin et al.

(10) Patent No.: US 8,561,575 B2
(45) Date of Patent: Oct. 22, 2013

(54) APPARATUS FOR DULLING ANIMAL CLAWS AND METHODS OF MANUFACTURING THE SAME

(75) Inventors: Carole Ruffin, Cleveland, OH (US); Ian D. Kovacevich, Charlotte, NC (US); Jerry Shew, Charlotte, NC (US); Jordan Lay, Charlotte, NC (US); Daniel Lee Bizzell, Davidson, NC (US)

(73) Assignee: Edison Nation, LLC, Charlotte, NC (US)

( * ) Notice: Subject to any disclaimer, the term of this patent is extended or adjusted under 35 U.S.C. 154(b) by 876 days.

(21) Appl. No.: 12/497,672

(22) Filed: Jul. 5, 2009

(65) Prior Publication Data

US 2010/0000558 A1  Jan. 7, 2010

Related U.S. Application Data

(60) Provisional application No. 61/078,393, filed on Jul. 5, 2008.

(51) Int. Cl.
*A01K 15/02* (2006.01)

(52) U.S. Cl.
USPC ........................................ 119/706

(58) Field of Classification Search
USPC .................. 119/706, 702, 707, 709, 711, 600
See application file for complete search history.

(56) References Cited

U.S. PATENT DOCUMENTS

| 2,504,282 | A |   | 4/1950  | Tobias |
|-----------|---|---|---------|--------|
| 3,273,537 | A |   | 9/1966  | Orr |
| 3,482,548 | A | * | 12/1969 | Burns ........................ 119/706 |
| 3,486,485 | A |   | 12/1969 | Kahanick |
| 3,993,027 | A |   | 11/1976 | Mullin |
| 4,996,946 | A |   | 3/1991  | Olson |
| 5,042,430 | A |   | 8/1991  | Casmira |
| 5,176,155 | A |   | 1/1993  | Rudolph, Jr. |
| 5,218,930 | A |   | 6/1993  | Casmira |
| 5,269,261 | A |   | 12/1993 | McCance |
| 5,275,181 | A |   | 1/1994  | Rudolph, Jr. |
| 5,377,617 | A |   | 1/1995  | Harwich |

(Continued)

FOREIGN PATENT DOCUMENTS

| JP | 11018609 A | 1/1999 |
| JP | 02003180188 A | 7/2003 |
| WO | 2011106018 A1 | 9/2011 |

OTHER PUBLICATIONS

"The Free Dictionary," copyright 2000, The American Heritage Dictionary, "Sandpaper,"Houghton Miffin Company.*

(Continued)

*Primary Examiner* — Monica Williams
*Assistant Examiner* — Timothy Schwarz
(74) *Attorney, Agent, or Firm* — Tillman Wright, PLLC; James D. Wright; David R. Higgins

(57) ABSTRACT

A dulling assembly includes a corrugated bundle having a plurality of generally vertically oriented planar paperboard sheets with fluted paperboard sheets located therebetween, each fluted paperboard sheet being adhered to the two planar paperboard sheets it is located between, and a plurality of grains of sand adhered with glue to a top surface of the corrugated bundle. A method of creating a dulling assembly includes the steps of providing a corrugated bundle, applying glue to a top surface of the corrugated bundle; and applying sand to the top surface of the corrugated bundle.

10 Claims, 21 Drawing Sheets

(56) References Cited

U.S. PATENT DOCUMENTS

| | | | |
|---|---|---|---|
| 5,564,365 | A | 10/1996 | Kacic |
| 5,579,720 | A | 12/1996 | Udelle et al. |
| 5,816,195 | A | 10/1998 | Flynn |
| 5,842,440 | A | 12/1998 | Bell, Jr. |
| 5,875,737 | A | 3/1999 | Boshears |
| 5,924,383 | A | 7/1999 | Smith |
| 6,109,212 | A | 8/2000 | Schacherbauer |
| 6,205,955 | B1 | 3/2001 | Diep |
| 7,011,043 | B2 | 3/2006 | Diep |
| 2004/0139926 | A1 | 7/2004 | Diep |
| 2008/0099032 | A1 | 5/2008 | Jackson |
| 2008/0276878 | A1* | 11/2008 | Ebert .................. 119/706 |

OTHER PUBLICATIONS

"Safe Toys for Your Cat," Oct. 16, 2006, PetPlace.com.*

"Playsand Information," Feb. 2, 2003, Safe Sand Company.*

"International Search Report" and "Written Opinion of the International Search Authority" (Korean Intellectual Property Office) in Edison Nation, LLC et al., International Patent Application Serial No. PCT/US2010/025618, dated Nov. 22, 2010, 6 pages.

WideBody Cat Scratcher and SuperScratcher+, WorldWise Inc., Aug. 30, 2001, 15 pages, http://www.worldwise.com/widbodcatscr.html.

Cosmic Cat Scratchers, Cosmic Pet Products, Inc., Oct. 19, 2000, 3 pages, http://web.archive.org/web/20001019064211/http://www.cosmicpet.com/scratchers.

WorldWise Cat Scratcher, CatFancy Magazine, Dec. 2000, 4 pages, http://store5.yimg.com/1/worldwise_1784_5256274.

John Wilkens, Wishful Tinkers, SignOnSanDiego.com of the San Diego Union-Tribune, Jul. 6, 2008, 4 pages, http://signonsandiego.printthis.clickability.com/pt/cpt?action=cpt&title=SignOnSanDiego.com, Union-Tribune Publishing Co., San Diego, California.

* cited by examiner

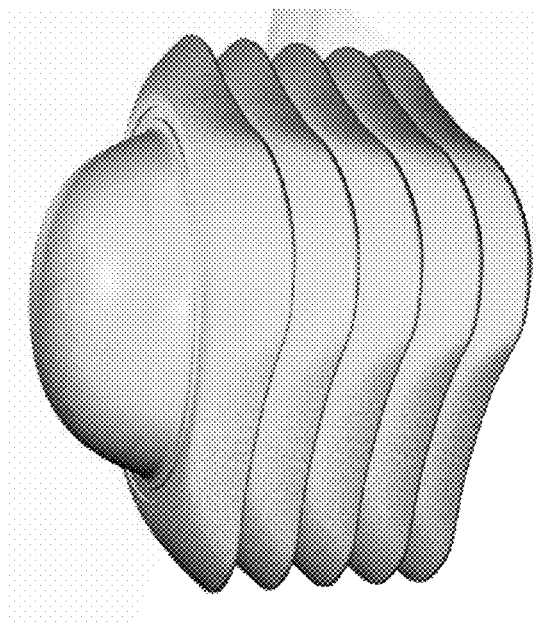
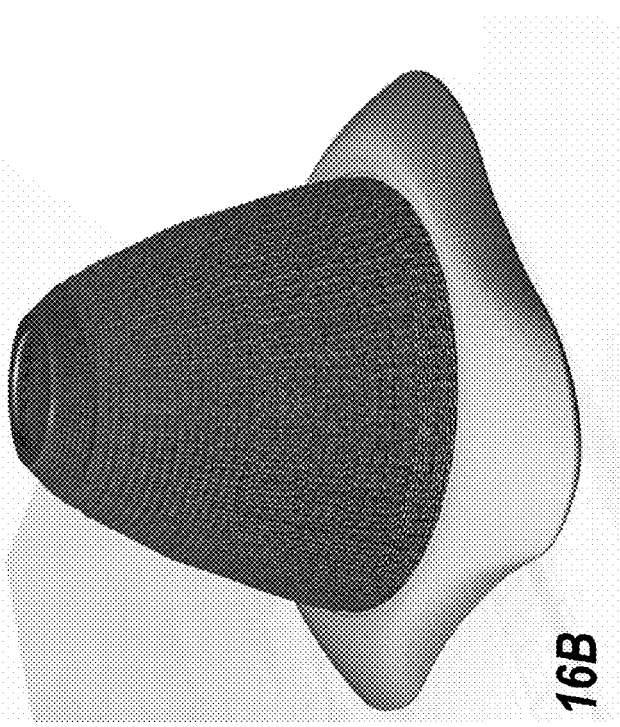
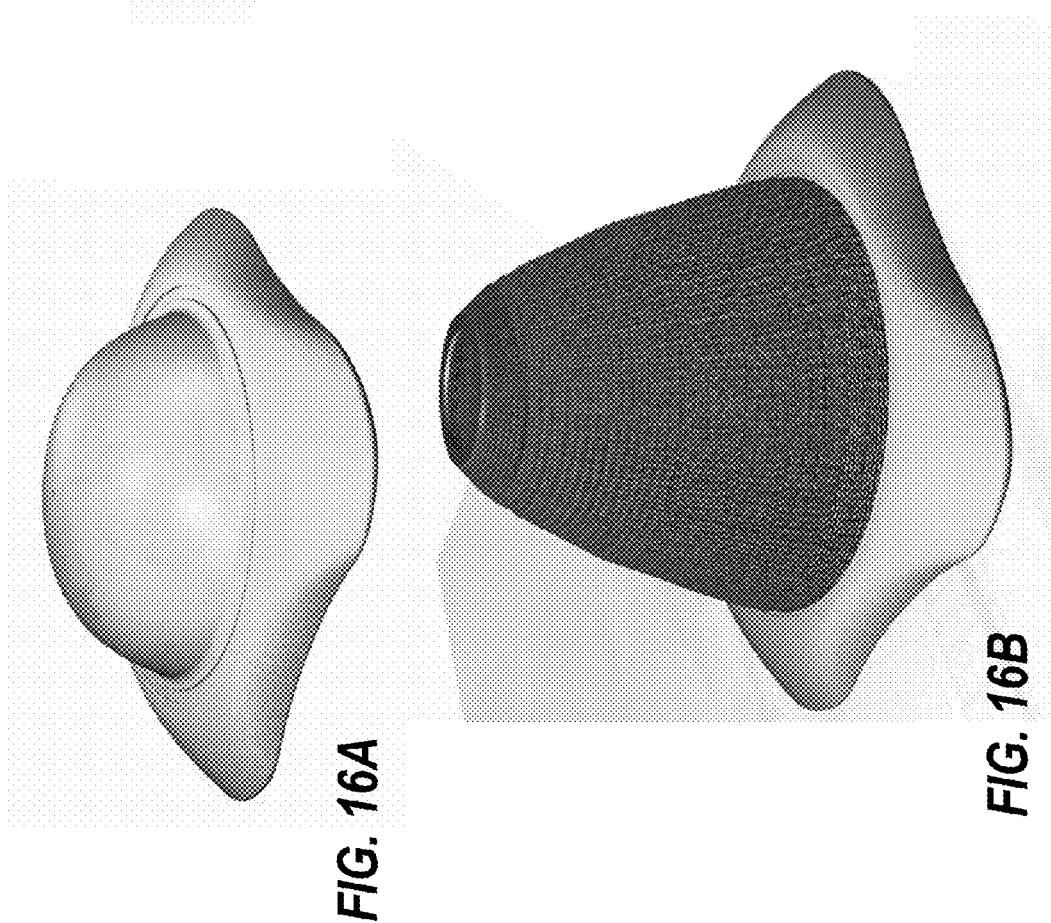
FIG. 16A
FIG. 16B
FIG. 16C

APPARATUS FOR DULLING ANIMAL CLAWS AND METHODS OF MANUFACTURING THE SAME

CROSS REFERENCE TO RELATED APPLICATIONS

The present application is a U.S. nonprovisional patent application of, and claims priority under 35 U.S.C. §119(e) to, U.S. provisional patent application Ser. No. 61/078,393, filed Jul. 5, 2008, which provisional patent application is incorporated by reference herein. A copy of U.S. provisional patent application Ser. No. 61/078,393 is submitted herewith as Appendix A.

Each of the following patents, patent applications, and patent application publications are incorporated by reference herein:
- (a) U.S. Pat. No. 7,011,043, which issued on Mar. 14, 2006;
- (b) U.S. nonprovisional patent application Ser. No. 10/751,206, which was filed on Jan. 2, 2004 and published as U.S. Application Publication No. 2004/0139926 A1 on Jul. 22, 2004;
- (c) U.S. provisional patent application Ser. No. 60/472,444, which was filed on May 20, 2003; and
- (d) U.S. provisional patent application Ser. No. 60/437,908, which was filed on Jan. 2, 2003.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to an apparatus for dulling animal claws using corrugated material and abrasive surfaces. U.S. Pat. No. 7,011,043 B2 discloses an apparatus and assemblies for dulling animal claws using corrugated material and abrasive surfaces. Although claims of this '043 patent cover one or more preferred embodiments of the present invention, it is believed that one or more modifications and improvements contained in the present application represent patentable subject matter. This '043 patent is hereby incorporated herein by reference, however, to the extent that any description in the '043 patent conflicts with or is inconsistent with any description contained hereinbelow, the description hereinbelow shall be construed as a preferred embodiment and the description contained in the '043 patent shall be construed as an alternative embodiment. Nothing contained in the '043 patent shall be construed as limiting the present invention or the description hereinbelow.

SUMMARY OF THE INVENTION

The present invention includes many aspects and features. Moreover, while many aspects and features relate to, and are described in, the context of a scratch toy, the present invention is not limited to use only in this context, as will become apparent from the following summaries and detailed descriptions of aspects, features, and one or more embodiments of the present invention.

Accordingly, one aspect of the present invention relates to a dulling assembly. The dulling assembly includes a corrugated bundle having a plurality of vertically oriented planar paperboard sheets with fluted paperboard sheets located therebetween, each fluted sheet being adhered to the two planar sheets it is located between, and a plurality of grains of sand adhered with glue to a top surface of the corrugated bundle.

In features of this aspect of the invention, the planar sheets and the fluted sheets each have an arced shape such that the corrugated bundle has an arcuate shape; the corrugated bundle includes E flute corrugated fiberboard; the sand is safe for consumption by humans and pets; the sand is edible; the glue is wood glue; the glue and sand are applied on an assembly line; the dulling assembly is received within a frame; the frame has a plurality of openings configured to receive elliptical objects; the frame has rubber feet; the corrugated bundle includes an inclined surface; the corrugated bundle includes two inclined surfaces; the corrugated bundle is a generally arcuate corrugated bundle; the corrugated bundle includes a plurality of inclined surfaces in different directions; the corrugated bundle includes a plurality of surfaces inclined with respect to different dimensions; the dulling assembly further includes side panels; the side panels are secured in place by a plurality of insertion rods; the insertion rods are removably secured in place; and the insertion rods are permanently secured in place.

A second aspect of the present invention relates to a method of creating a dulling assembly. The method includes the steps of providing a corrugated bundle, applying glue to a top surface of the corrugated bundle; and applying sand to the top surface of the corrugated bundle.

In features of this aspect of the invention, the corrugated bundle includes E flute corrugated fiberboard; the glue is rolled on; the glue is sprayed on; the step of applying sand includes pressing the top surface of the corrugated bundle into sand; the step of applying sand includes scattering sand across the top surface of the corrugated bundle; the sand is safe for human consumption; the glue is wood glue; the last two steps are performed on an assembly line; and the last two steps are automated.

A third aspect of the present invention relates to a corrugated bundle having a generally arcuate shape.

A fourth aspect of the present invention relates to a method of creating a dulling assembly. The method includes the steps of providing a corrugated bundle, applying glue to a top surface of the corrugated bundle, and applying sand to the top surface of the corrugated bundle.

In features of this aspect of the invention, the corrugated bundle has at least one liner wall and at least one rippled sheet coupled thereto.

A fifth aspect of the present invention relates to a dulling assembly that includes a corrugated bundle having a plurality of generally vertically oriented planar paperboard sheets with fluted paperboard sheets located therebetween and a plurality of grains of sand adhered with glue to a top surface of the corrugated bundle. Each fluted paperboard sheet is adhered to the two planar paperboard sheets it is located between.

In features of this aspect, the planar paperboard sheets and the fluted paperboard sheets each have an arced shape such that the corrugated bundle has a generally arcuate shape; the corrugated bundle includes E flute corrugated fiberboard; the sand adhered to the top surface is safe for consumption by humans and pets; the sand is edible; the glue is wood glue; the dulling assembly is configured to be received within a frame; and the corrugated bundle includes at least one inclined surface.

A sixth aspect of the present invention relates to a dulling assembly that includes a corrugated bundle having a plurality of planar paperboard sheets arranged in generally parallel, spaced-apart relationship, each planar paperboard sheet being generally vertically oriented such that a lengthwise edge is exposed, and a plurality of fluted paperboard sheets, each fluted paperboard sheet being positioned between adjacent ones of the plurality of planar paperboard sheets and being generally vertically oriented such that a lengthwise edge is exposed. Each fluted paperboard sheet is adhered to the two adjoining planar paperboard sheets. The lengthwise edges of each of the plurality of planar paperboard sheets and the plurality of fluted paperboard sheets together define a top surface of the corrugated bundle. The dulling assembly further includes at least one abrasive layer applied to the top surface of the corrugated bundle.

In features of this aspect, the at least one abrasive layer includes a plurality of grains of sand; the corrugated bundle includes E flute corrugated fiberboard; and the planar paperboard sheets and the fluted paperboard sheets each have an arced shape such that the corrugated bundle has a generally arcuate shape.

A seventh aspect of the present invention relates to a method of manufacturing a dulling assembly. The method includes the steps of providing a corrugated bundle having a plurality of vertically oriented planar paperboard sheets with fluted paperboard sheets located therebetween, each fluted paperboard sheet being adhered to the two planar paperboard sheets it is located between; applying glue to a top surface of the corrugated bundle; and applying sand to the top surface of the corrugated bundle.

In features of this aspect, the corrugated bundle includes E flute corrugated fiberboard; the step of applying glue includes rolling glue onto to the top surface; the step of applying glue includes spraying glue onto the top surface; the step of applying sand includes pressing the top surface of the corrugated bundle into sand; the step of applying sand includes scattering sand across the top surface of the corrugated bundle; the steps of applying glue and applying sand are performed on an assembly line; and the steps of applying glue and applying sand are part of an automated process.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

FIGS. 13-16 are illustrations of the corrugated bundle of FIG. 11 in combination with various frames configured to receive the bundle;

DETAILED DESCRIPTION

Figure 1:
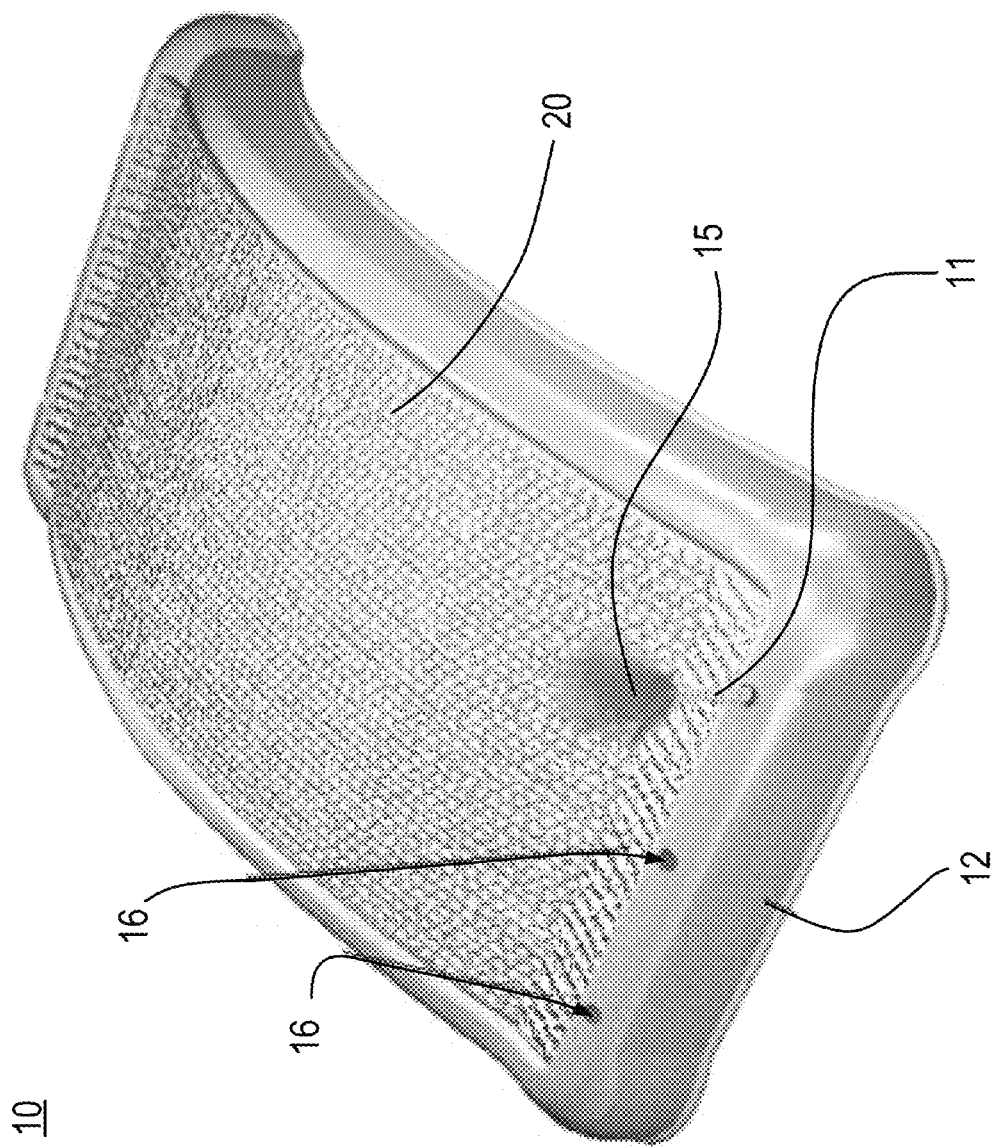
FIG. 1 is a perspective view of an apparatus for dulling animal claws in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Herein, should there exist a conflict or discrepancy between a number expressed with alphabetical characters and a number expressed in decimal form, the description shall be construed as describing both as viable possibilities. In the event that this interpretation is untenable, the number expressed in decimal form shall govern.

Referring now to the drawings, one or more preferred embodiments of the present invention are next described. The following description of one or more preferred embodiments is merely exemplary in nature and is in no way intended to limit the invention, its implementations, or uses.

FIG. 1 is a perspective view of an apparatus 10 for dulling animal claws in accordance with a preferred embodiment of the present invention. As shown therein, the animal claw dulling apparatus 10 includes a frame 12 and a dulling assembly 20. As will be appreciated, the dulling assembly 20 is removably received within the frame 12, as can be seen in FIG. 2, which is a perspective view of the apparatus of FIG. 1 illustrating the separation of the dulling assembly 20 from the frame 12.

Figure 2:
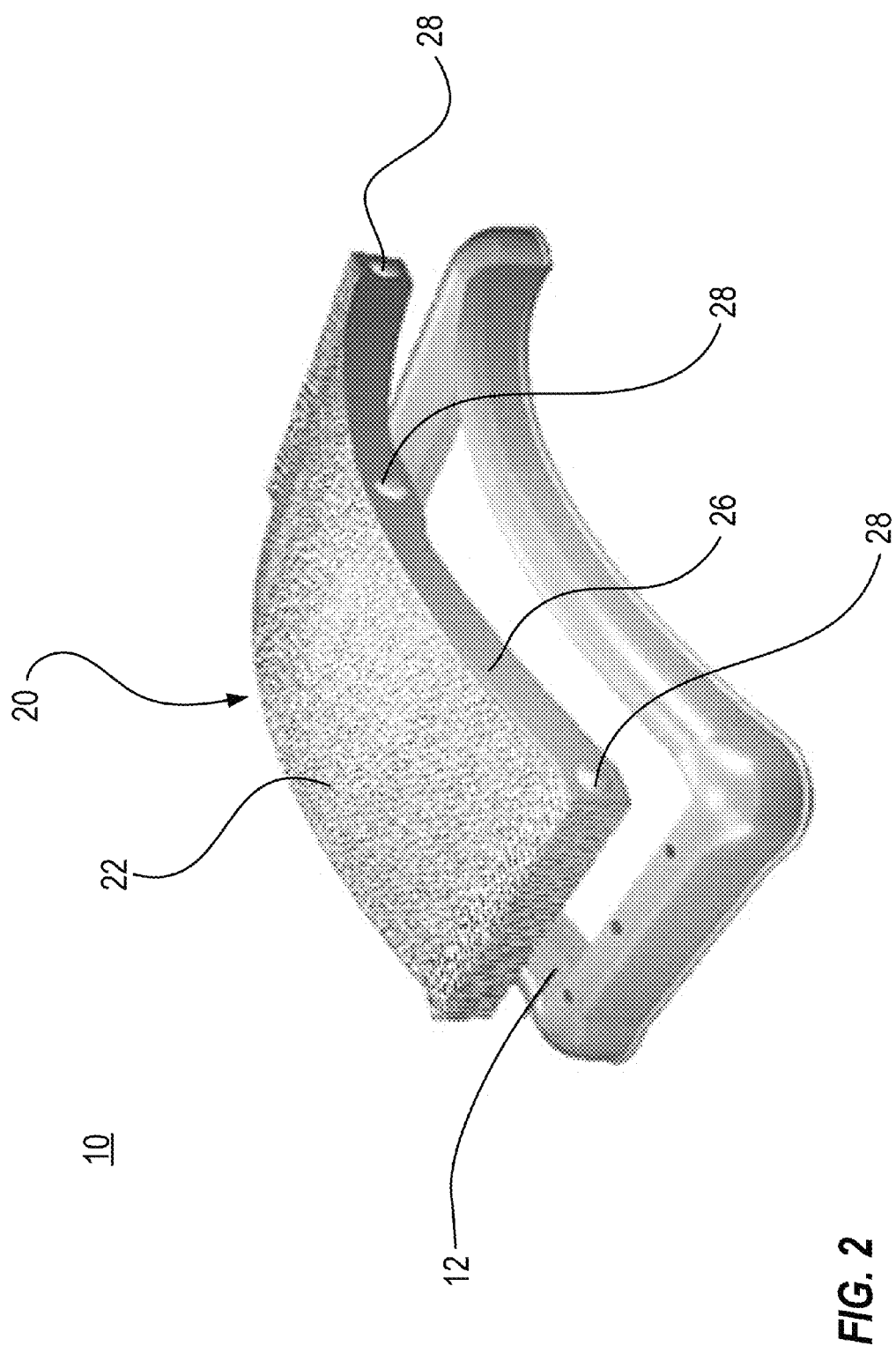
FIG. 2 is a perspective view of the apparatus of FIG. 1 illustrating the separation of the dulling assembly from the frame.
Figure 3:
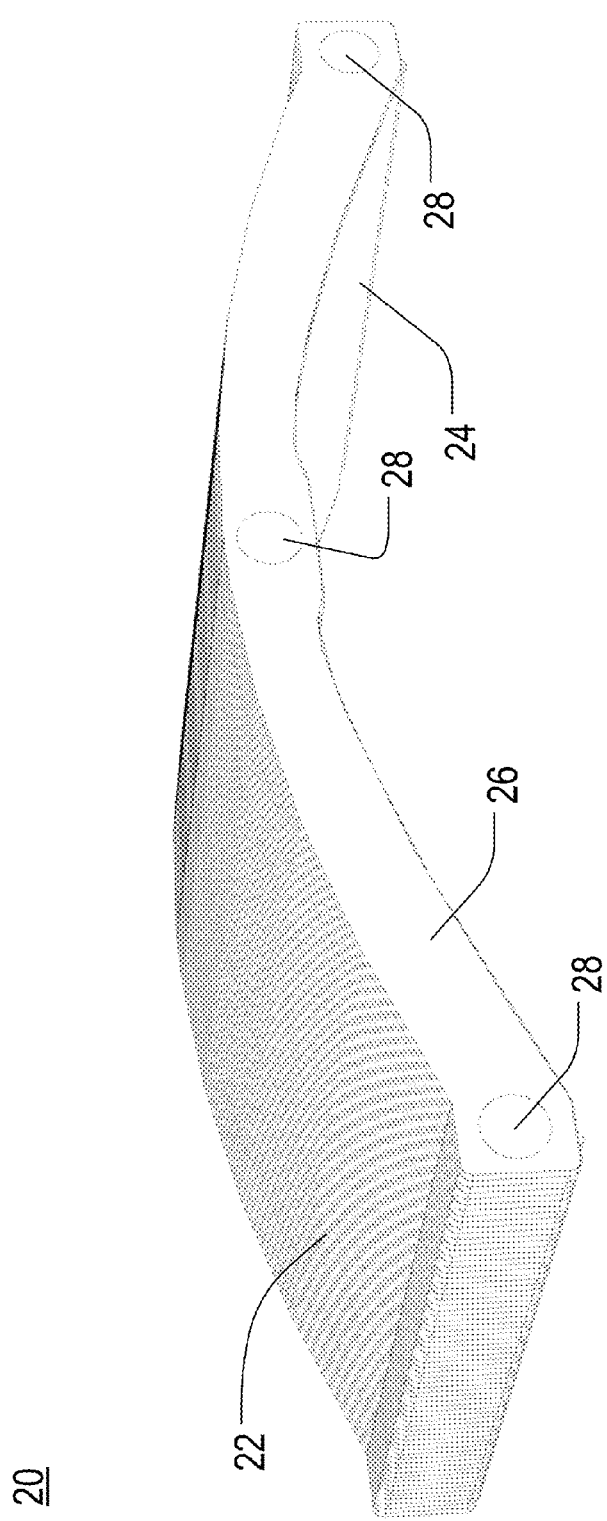
FIG. 3 is a perspective view of the dulling assembly of FIG. 2.
Figure 4:
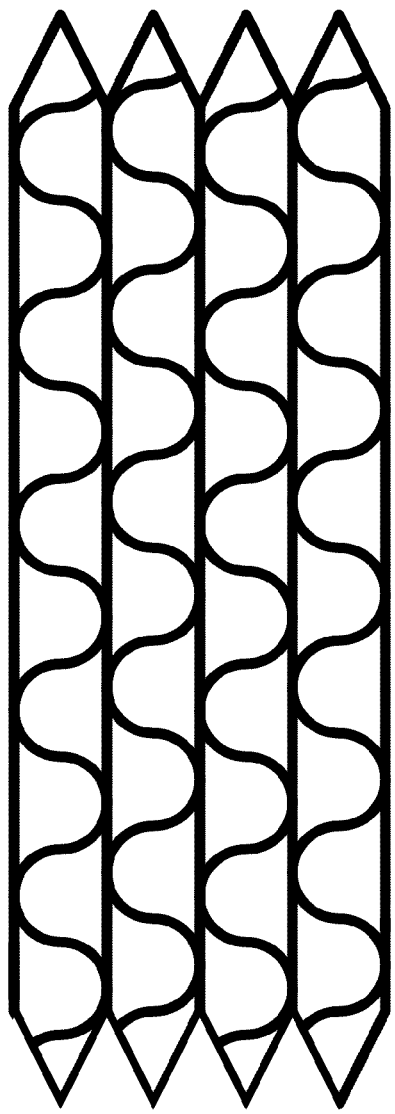
FIG. 4 is a fragmented, top plan view of an exemplary portion of corrugated fiberboard of the dulling assembly of FIG. 3.

FIG. 3 is a perspective view of the dulling assembly 20 of FIG. 2. The dulling assembly 20 includes a corrugated bundle 22, composed of corrugated fiberboard. It will be appreciated that corrugated fiberboard traditionally is constructed using paperboard, a paper like material over one one-hundredths of an inch (0.01 inches; 0.25 mms) in thickness. A fluted sheet of paperboard is attached with a starch based adhesive to one or two planar sheets of paperboard to form corrugated fiberboard. FIG. 4 is a fragmented, top plan view of an exemplary portion of corrugated fiberboard of the dulling assembly of FIG. 3. The fluted sheet is considered fluted because its cross-section resembles a wave function. It will be appreciated that standard designations exist for various degrees of fluting in corrugated fiberboard. For example, E flute is a standard designation for corrugated fiberboard having ninety plus or minus four (90+/−4) flutes per lineal foot and a flute thickness of one sixteenth (1/16) of an inch (420+/−13 flutes per lineal meter with a flute thickness of 1.6 mm).

The corrugated fiberboard of the corrugated bundle 22 comprises a plurality of planar paperboard sheets, or liner walls. Each of these paperboard sheets is generally vertically oriented, such that a lengthwise edge of each paperboard sheet faces upwards. Located between any two adjacent planar paperboard sheets is a fluted, or rippled, paperboard sheet. Each fluted sheet is adhered to the two planar sheets between which it is located. Each face of each of the planar sheets and the fluted sheets has a generally arced shape, such that together the sheets comprise a generally arcuate piece of corrugated fiberboard, as can be seen in FIG. 2. This corrugated fiberboard preferably has a number of flutes per lineal foot consistent with an E flute designation.

Figure 5A:
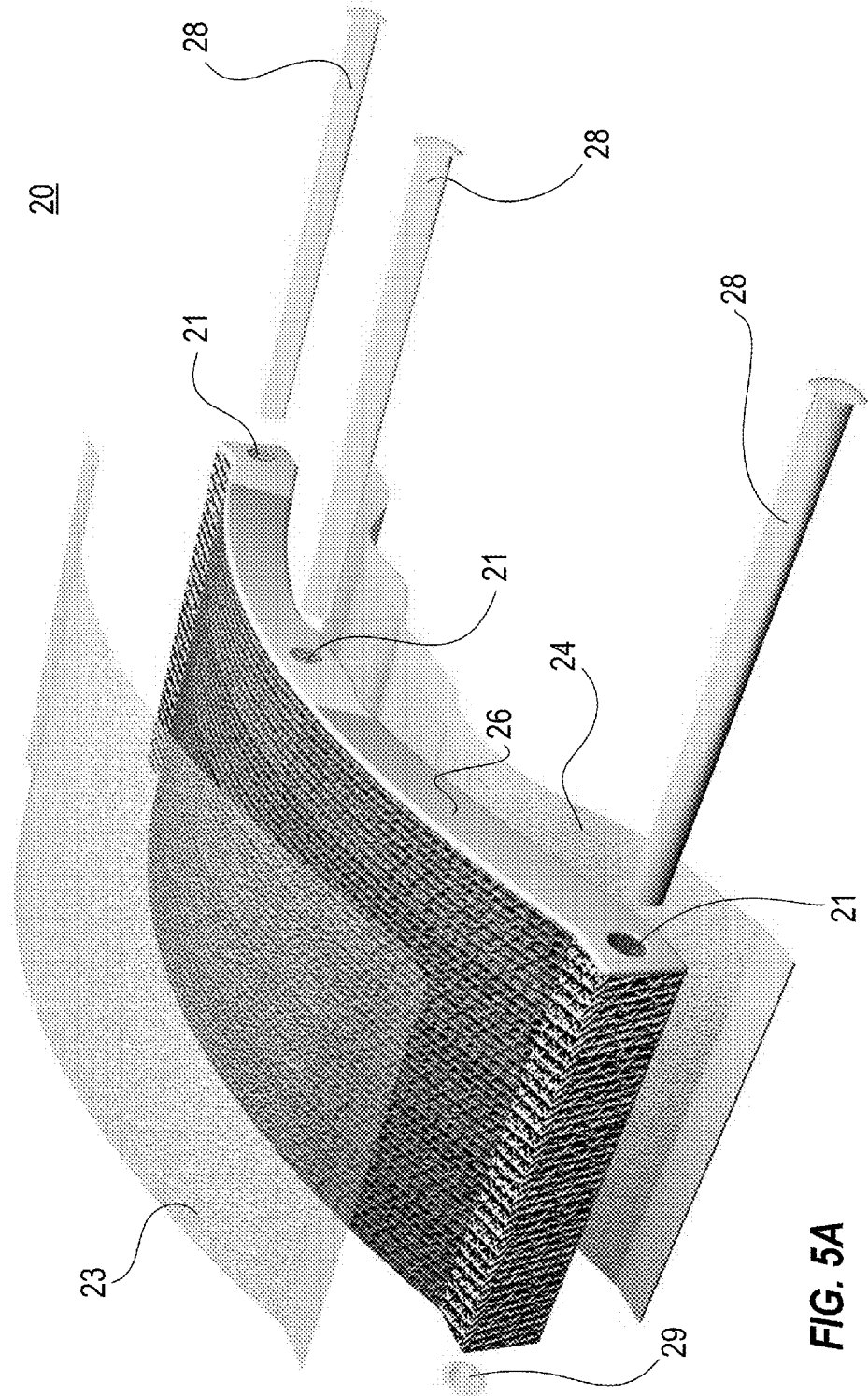
FIGS. 5A and 5B are exploded perspective views of the dulling assembly of FIG. 3.
Figure 5B:
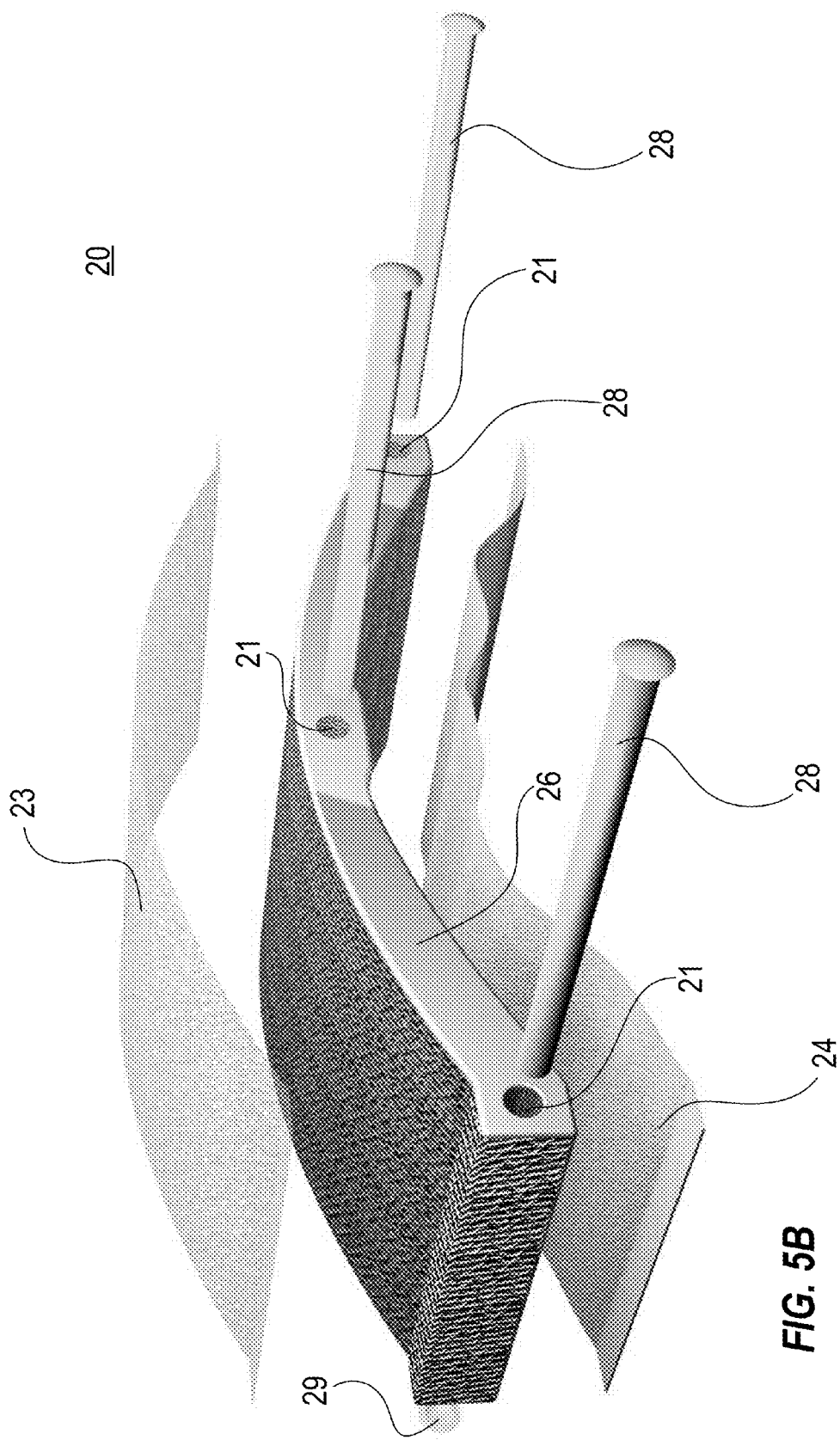

Further, this corrugated fiberboard is treated to increase its abrasive properties. FIGS. 5A and 5B are exploded perspective views of the dulling assembly 20 of FIG. 3. As illustrated therein, the dulling assembly 20 includes one or more abrasive layers 23 formed by rolling wood glue on to a top surface of the corrugated bundle 22, and then applying sand to this top surface. It will be appreciated that although the abrasive layer 23 may appear, as illustrated, to comprise a sheet or film, such illustration serves only to roughly correspond to a layer of glue and sand. The glue, although applied to the top surface of the corrugated bundle 22, can drip, be intentionally applied to, or otherwise saturate portions of the corrugated bundle other than a top edge of the paperboard sheets of the corrugated bundle 22. The glue can cover a portion of one or both faces of one or more paperboard sheets of the corrugated bundle 22. Likewise, grains of sand can be adhered to these faces.

The sand is preferably of a type commonly known as "playground sand" so that it will be edible and safe for consumption by humans and pets. This process of applying glue and sand to the corrugated bundle 22 can be performed on an assembly line by a manual and/or automated process.

As shown in FIGS. 5A and 5B, the corrugated bundle 22 includes a plurality of cylindrical hollows 21 running widthwise from one side to another. These cylindrical hollows 21 are each sized to receive an insertion rod 28, and each insertion rod 28 is dimensioned to be longer than the width of the corrugated bundle 22. Reinforcement panels 26, having cutouts corresponding to and aligned with each circular hollow 21, may be secured to each lateral side of the corrugated bundle 22 by inserting the insertion rods 28 into the cylindrical hollows 21. The insertion rods 28 can be secured in place by attachment of a rod cap 29 on the opposite lateral side of the corrugated bundle 22. The insertion rods 28 can be either removably or permanently attached.

Further, as shown in FIGS. 3, 5A and 5B, a pliable liner 24 may be provided on the bottom of the corrugated bundle 22 by securing the liner 24 to the bottom of the side panels 26, to the bottom of the corrugated bundle 22, or to both. This pliable liner 24 can help to prevent dust, fragments of the corrugated bundle 22, claw pieces, or the like, from falling through the dulling assembly 20 onto a surface below.

Figure 6:
FIG. 6 is a perspective view of a plurality of dulling assemblies, of the type illustrated in FIG. 3, stacked on top of one another.

FIG. 6 is a perspective view of a plurality of dulling assemblies 20, of the type illustrated in FIG. 3, stacked on top of one another. It will be appreciated that the generally arcuate shape of the dulling assembly 20 allows a plurality of dulling assemblies 20 to be stacked on top of one another in this manner for storage or the like.

Figure 7:
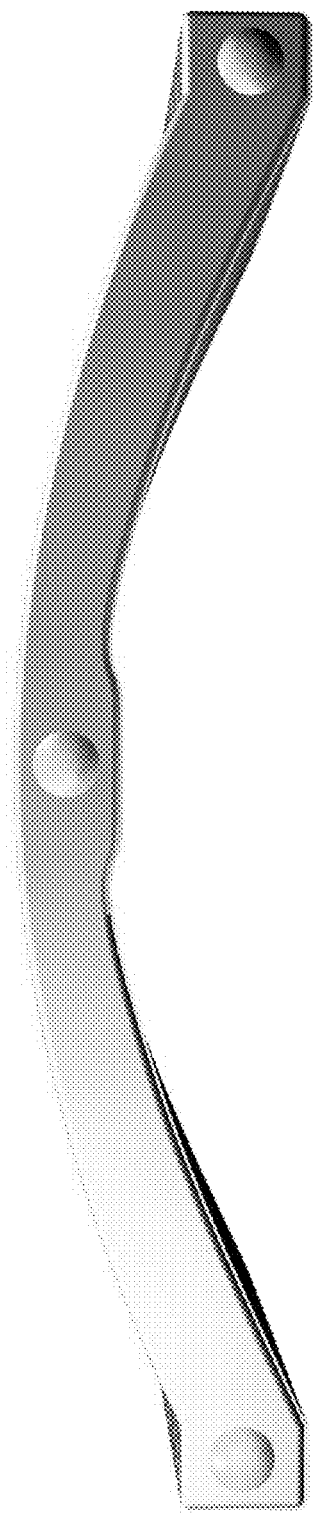
FIG. 7 is a side view of the dulling assembly of FIG. 3.

FIG. 7 is a side view of the dulling assembly of FIG. 3. As shown therein, although the profile of the dulling assembly 20 is generally arced, the profile is anomalous proximate each circular hollow 21, as can be seen in FIG. 7. More particularly, from the side, the profile includes two squared ends and a thickened section at the apex of the arc. Each end and the thickened section at the apex include a generally flat lower surface for better stability within the frame 12. Corresponding portions of the frame 12 are described hereinbelow.

The corrugated bundle 22 is described above as preferably comprising E flute fiberboard. It will be appreciated, however, that corrugated fiberboard of other designations, and indeed corrugated fiberboard without a specific designation, can be utilized in alternative embodiments. Likewise, in at least some alternative embodiments, other types of cardboard, paper, or paperboard can be used, as well as non-paper materials. In at least one alternative embodiment, a honeycomb composite is used.

Similarly, although the description above refers to the use of wood glue, in alternative embodiments, other types of glue can be utilized. Additionally, in at least some alternative embodiments, the glue that is applied is sprayed on rather than rolled on.

Further, although the sand described above is edible sand, alternative embodiments may use any variety of sand capable of enhancing the abrasive properties of the corrugated bundle 22.

Figure 8:
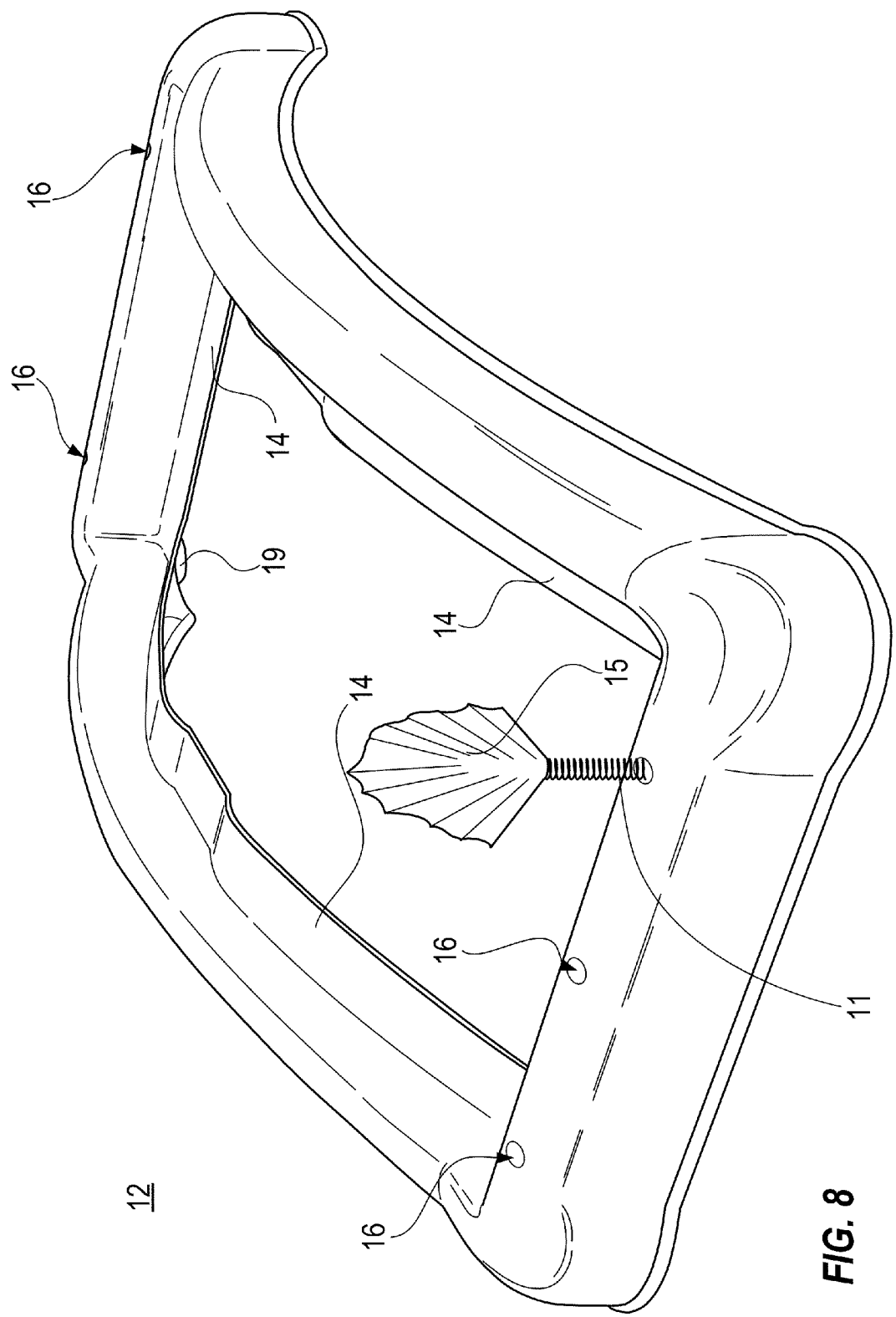
FIG. 8 is a perspective view of the frame of FIG. 2.
Figure 9:
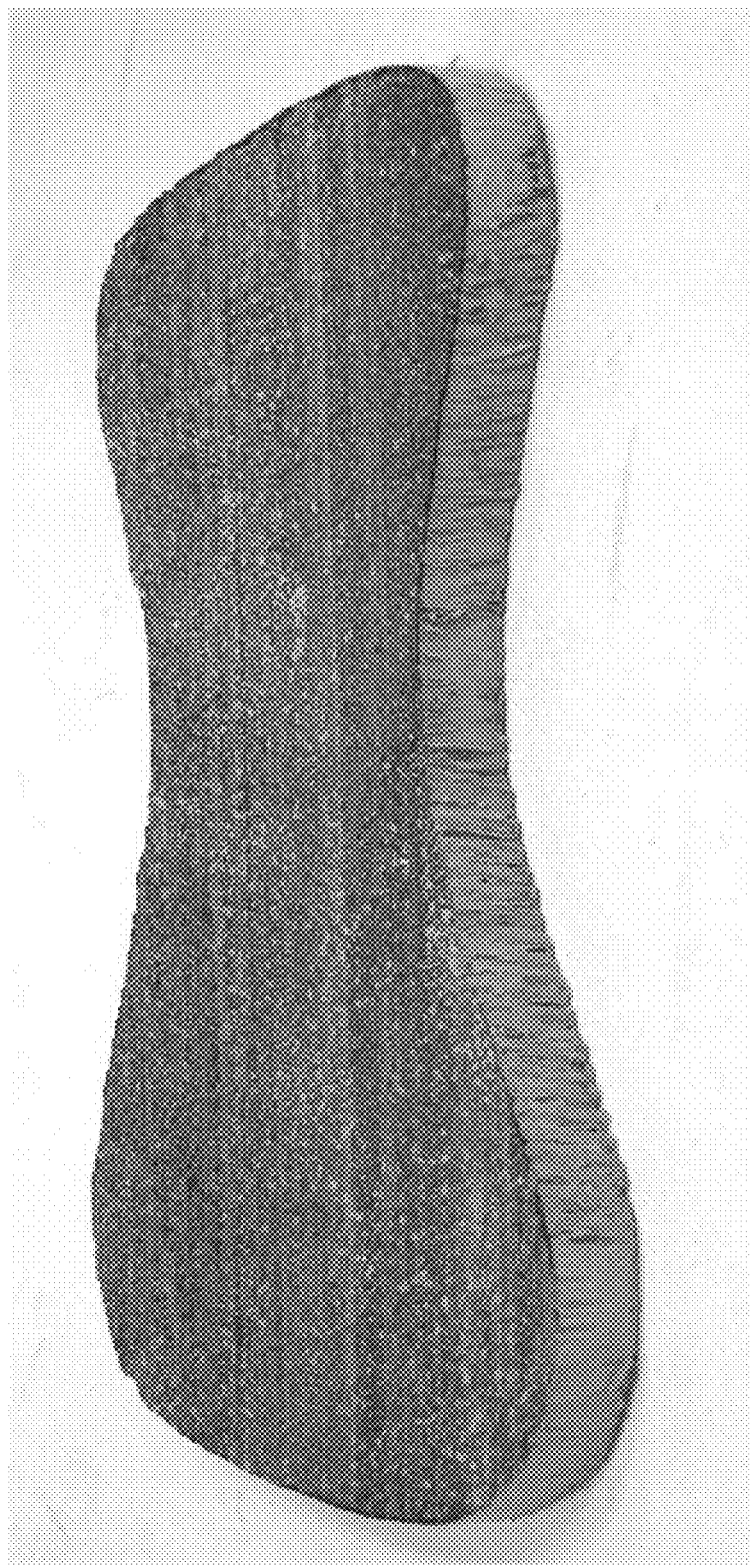
FIGS. 9-12 are illustrations of various alternatively shaped corrugated bundles in accordance with other preferred embodiments of the present invention.
Figure 10:
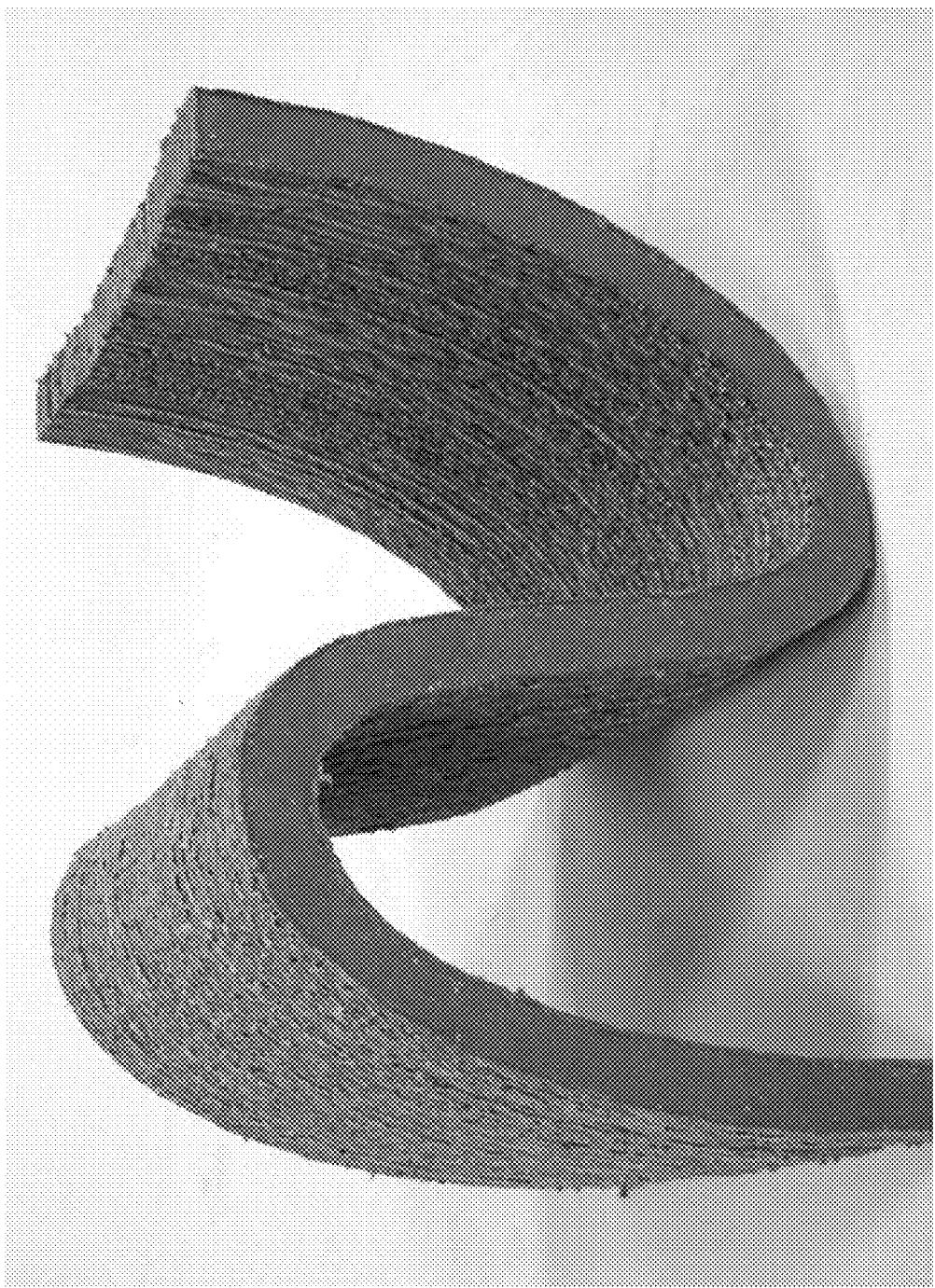
Figure 11:
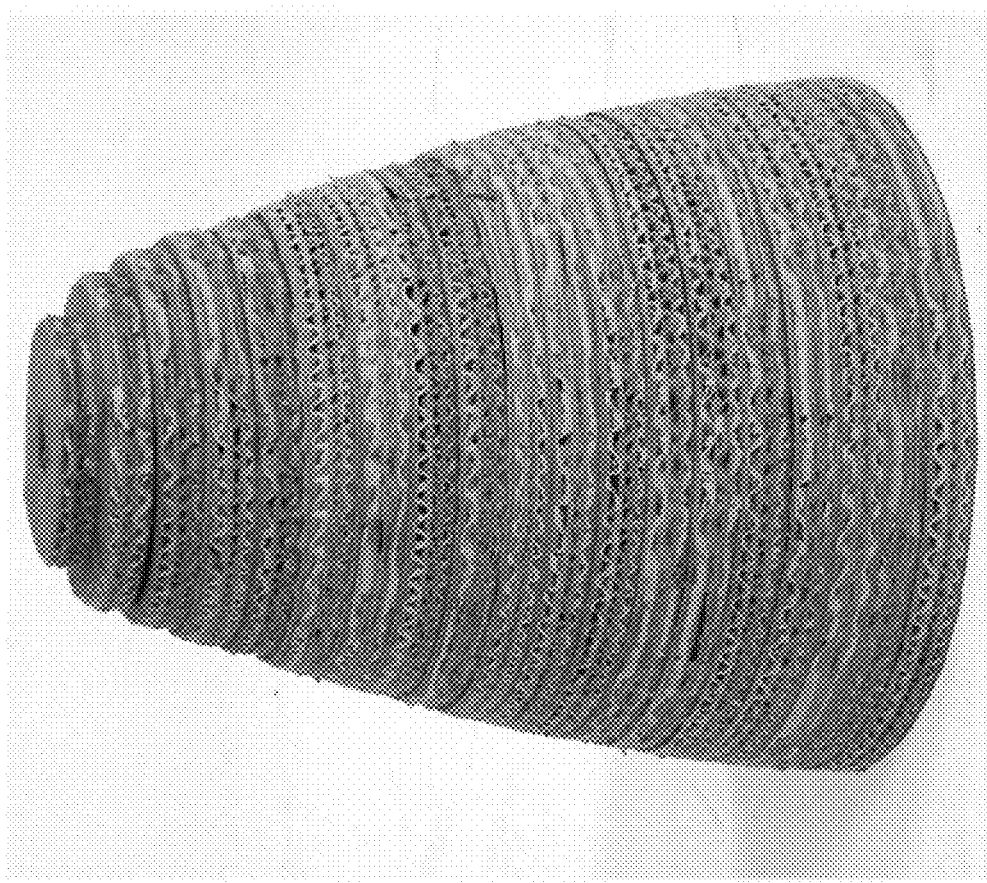

FIG. 8 is a perspective view of the frame 12 of FIG. 2. The frame 12 is shaped and dimensioned to receive the dulling assembly 20, as can be seen in FIG. 2. The frame 12 includes ledges 14 upon which the dulling assembly 20 rests when it is received within the frame 12. The frame 12 also includes a plurality of rubber feet 19 secured to the bottom thereof. Each rubber foot 19 is located proximate a corner of the frame 12.

The frame 12 further includes a plurality of receiving slots 16 disposed along the top of the frame and configured to receive objects therein. In FIG. 8, a pet toy, comprising a spring 11 and having a colorful feather bundle 15 attached thereto, has been inserted into one of the receiving slots 16. It is contemplated that other toys will be provided that are likewise sized and dimensioned to be received within the receiving slots 16. It is further contemplated that, in various commercial embodiments of the present invention, one or more of these toys may be packaged together with the animal claw dulling apparatus 10, packaged together with the frame 12, packaged together with the dulling assembly 20, packaged together with the corrugated bundle 22, and/or sold separately. It is likewise contemplated that corrugated bundles may be packaged together with a frame, or sold separately.

It will be appreciated that although the above description discloses a corrugated bundle 22 having a generally arcuate shape, a corrugated bundle constructed as described herein may take on a wide variety of alternative shapes, as illustrated by FIGS. 9-12. Further, a corrugated bundle as described in U.S. Pat. No. 7,011,043 B2, incorporated herein by reference, is contemplated for use as well.

An arcuate corrugated bundle can be viewed as providing two inclined surfaces, each inclined in a different direction, for scratching by a pet. Further, it is contemplated that a corrugated bundle may provide inclined surfaces that are inclined with respect to different dimensions. Having multiple inclined surfaces in different directions and/or dimensions is believed to provide more scratching options for a pet, while the arcuate shape is believed to provide greater stability. In alternative embodiments, any number of inclined scratching surfaces may be provided in any number of directions and/or dimensions for scratching by a pet.

Figure 12:
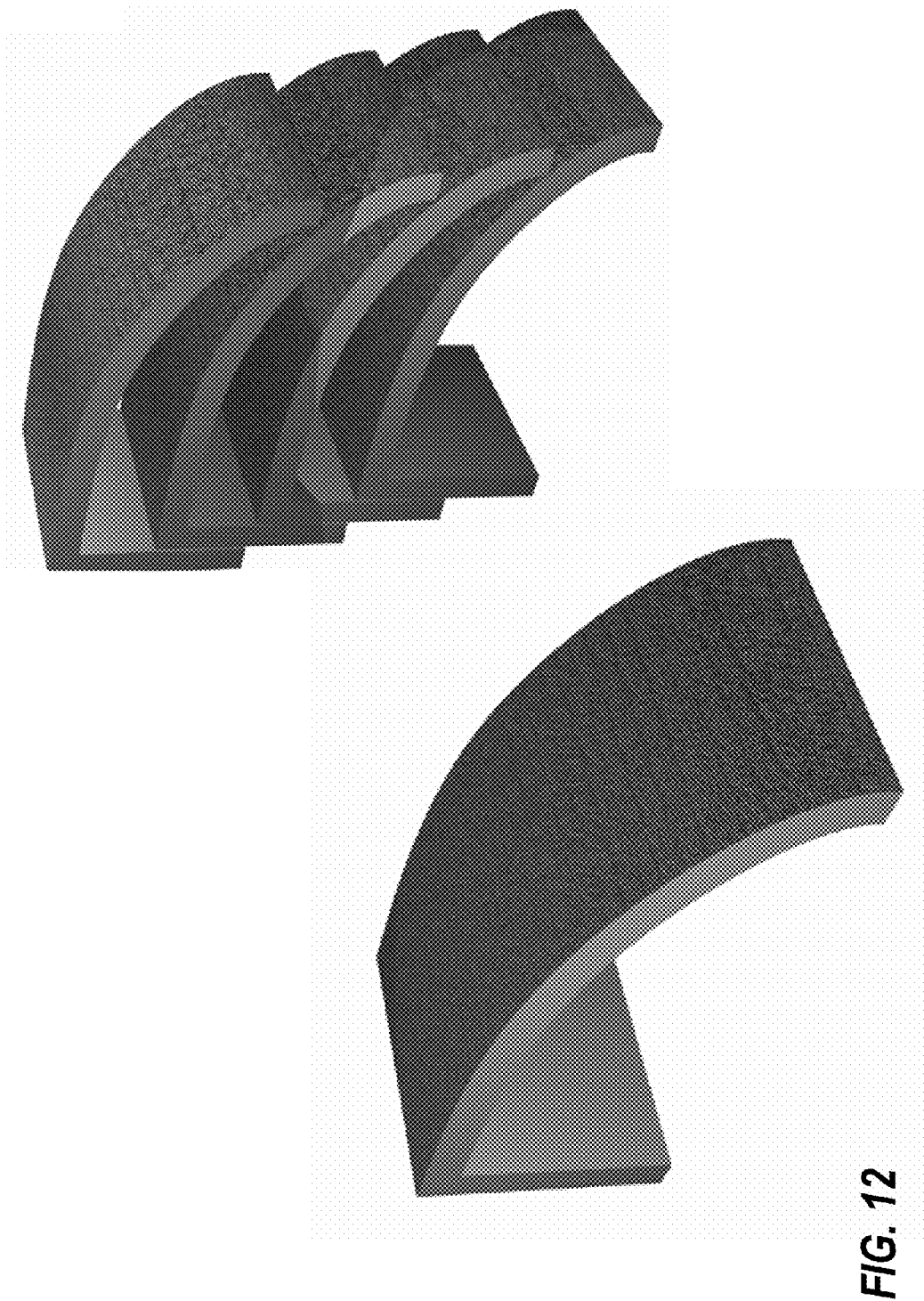
Figure 13A:
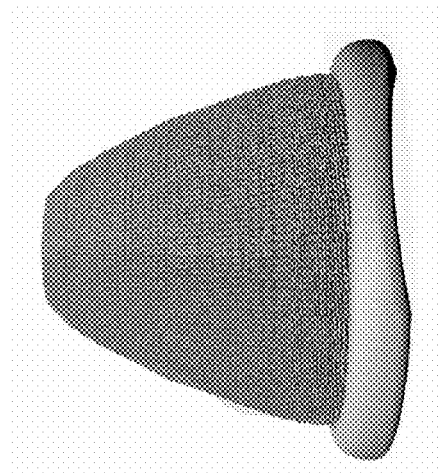
Figure 13B:
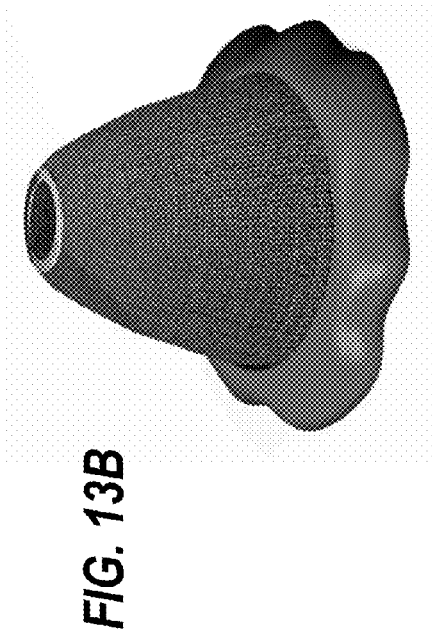
Figure 13C:
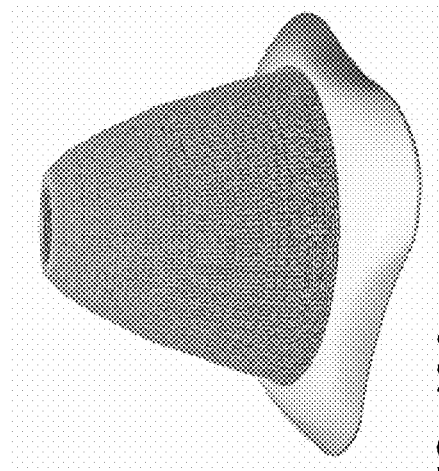
Figure 14A:
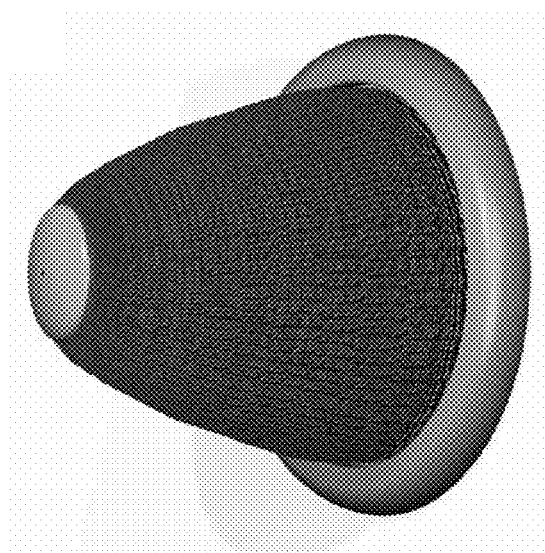
Figure 14B:
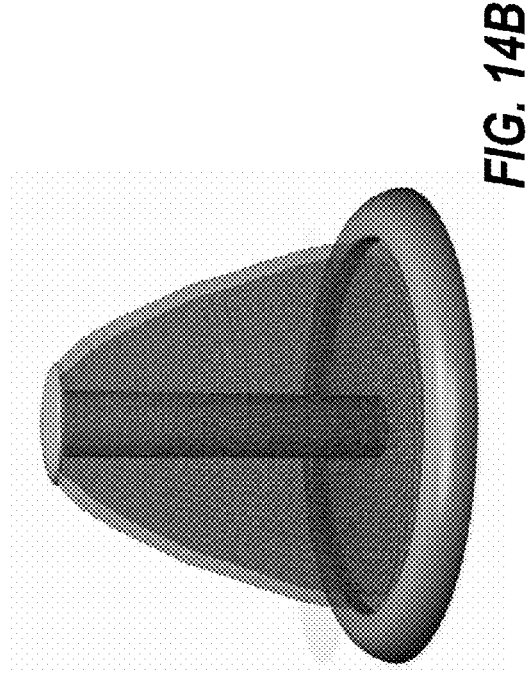
Figure 15C:
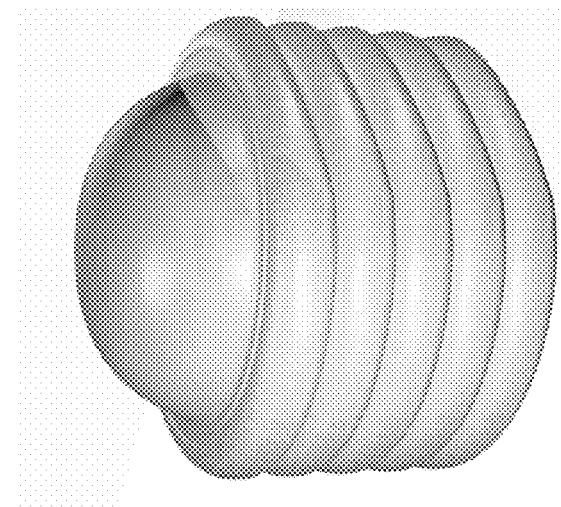
Figure 15B:
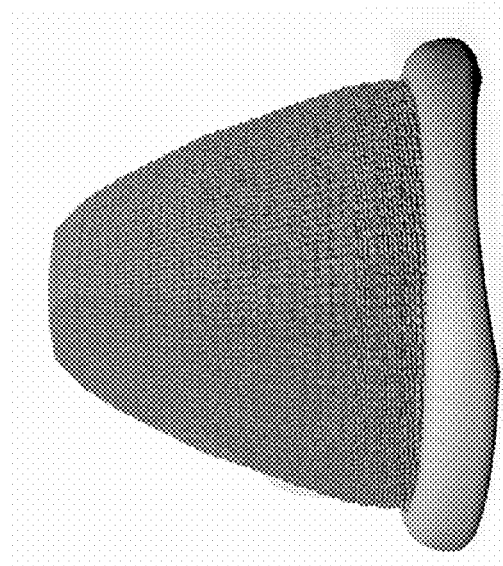
Figure 15A:
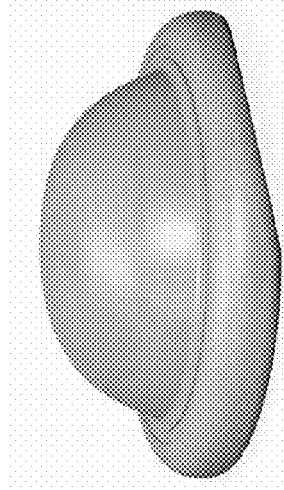

Just as alternatively shaped corrugated bundles may be utilized in alternatively embodiments, a dulling assembly may be configured to utilize alternatively shaped corrugated bundles, and a frame may be configured to receive these dulling assemblies. Alternatively, a frame may be configured to directly receive a corrugated bundle. FIGS. 13-16 illustrate frames configured to receive the corrugated bundle of FIG. 11. It will be appreciated that many of these corrugated bundles will be easily stackable, as can be seen in FIG. 12, and likewise many of these frames will be easily stackable, as can be seen in FIGS. 15-16.

Figure 17:
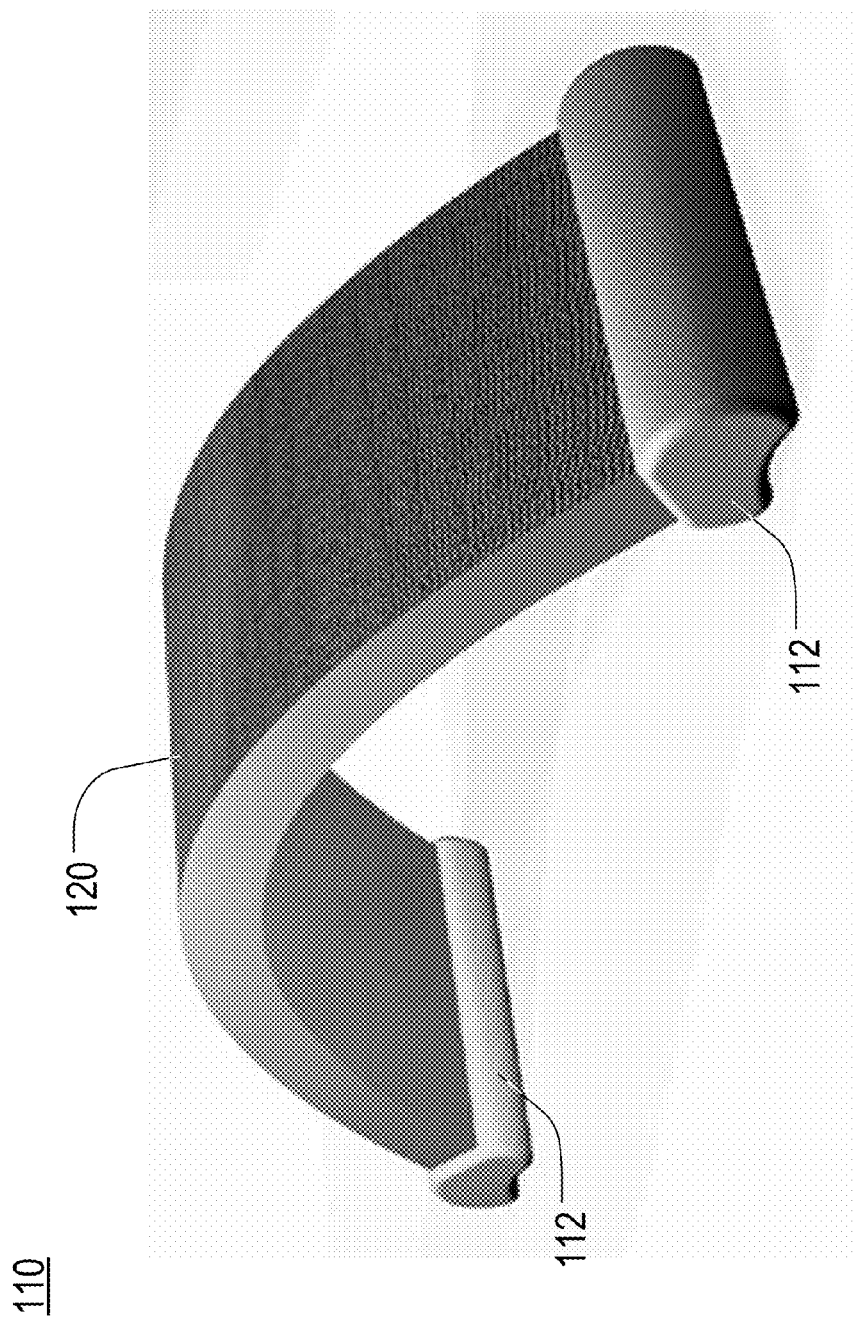
FIG. 17 is a perspective view of an apparatus, for dulling animal claws, having a frame comprised of two separate pieces in accordance with another preferred embodiment of the present invention.

In alternative embodiments, a frame may be designed as a plurality of separate pieces configured to together receive a corrugated bundle or a dulling assembly, as can be seen in FIG. 17. More particularly, in the embodiment illustrated in FIG. 17, an assembly 110 for dulling animal claws includes an arcuate corrugated bundle 120 received at each end by a frame end 112, but the two frame ends 112 are separate from each other.

Figure 18:
FIGS. 18-19 are perspective views of dulling assemblies designed and configured to stand alone in accordance with another preferred embodiment of the present invention.
Figure 19:
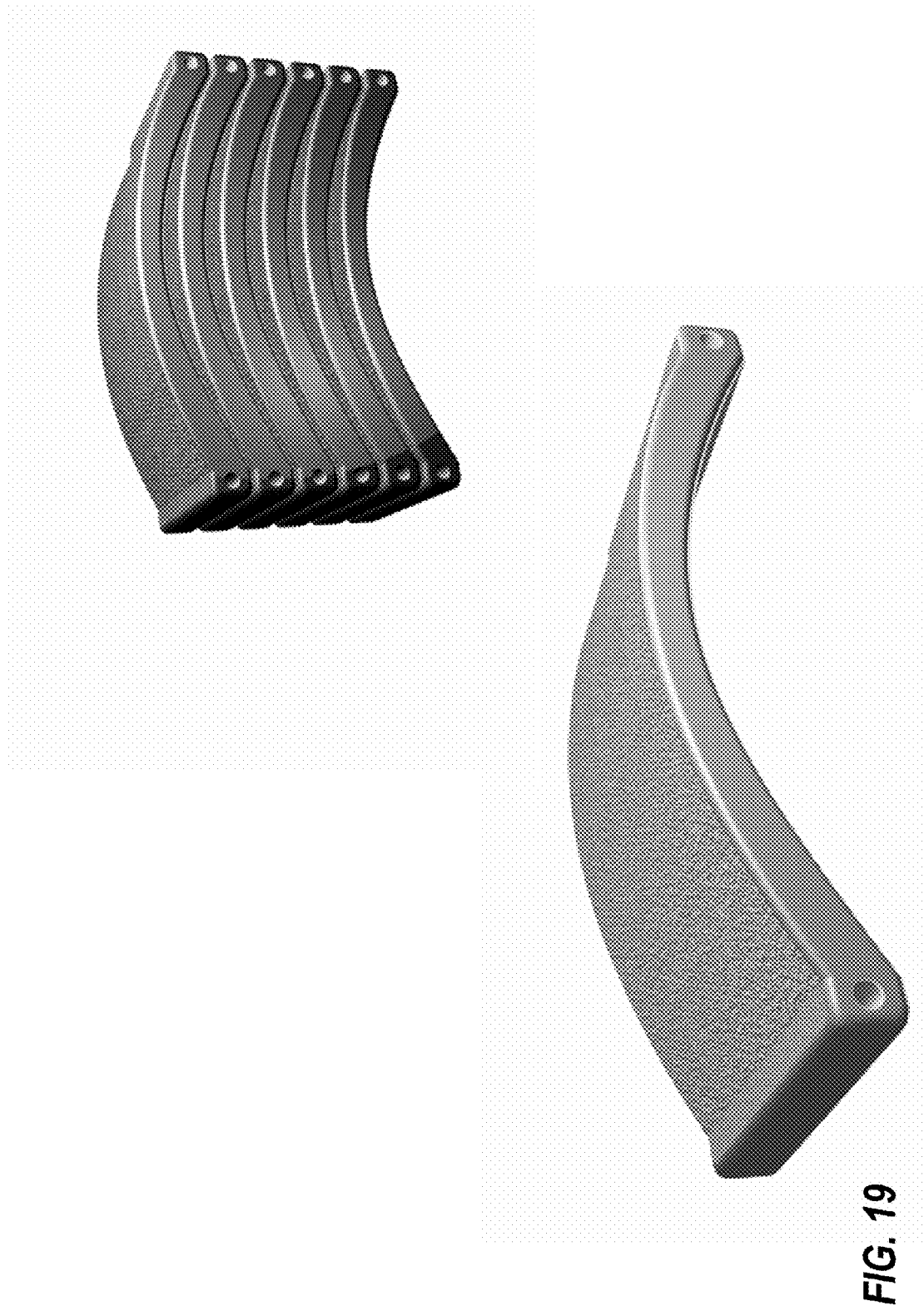

In alternative embodiments, a dulling assembly may be designed and configured to stand alone, rather than being designed and configured to be received within a frame, as can be seen in FIGS. 18-19.

Figure 20:
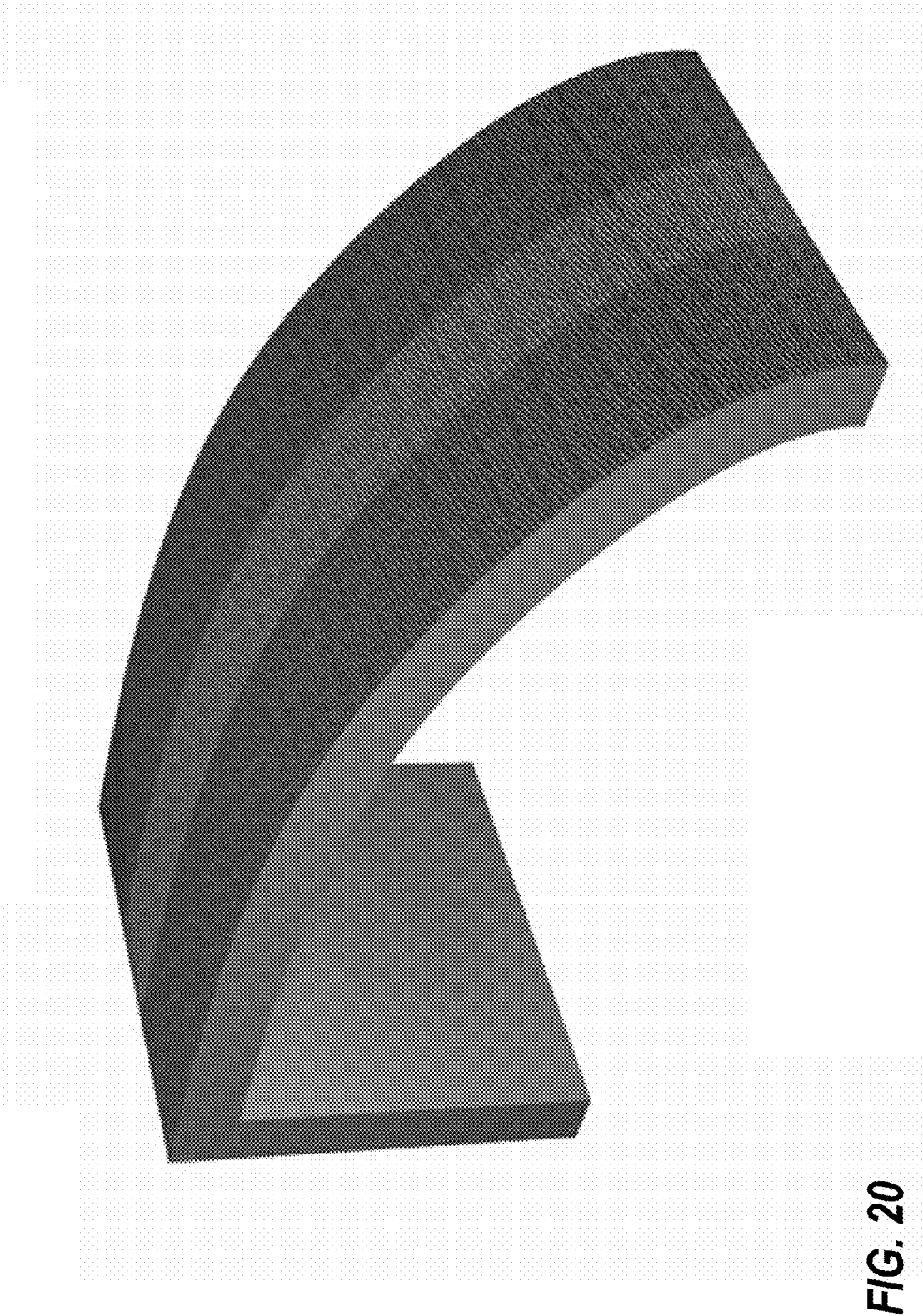
FIG. 20 is a perspective view of a corrugated bundle having segments of different colors.

In alternative embodiments, a portion of a corrugated bundle, or the entire corrugated bundle, may be colored. In alternative embodiments, a single corrugated bundle may include multiple segments colored differently, as can be seen in FIG. 20.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A dulling assembly comprised of a corrugated bundle, the dulling assembly comprising:
   a base surface;
   a plurality of planar paperboard sheets arranged in generally parallel, spaced-apart relationship, each planar paperboard sheet being oriented to extend generally perpendicularly away from the base surface such that a lengthwise edge is exposed;
   a plurality of fluted paperboard sheets, each fluted paperboard sheet being positioned between and adhered to two adjacent ones of the plurality of planar paperboard sheets and being oriented to extend generally perpendicularly away from the base surface such that a lengthwise edge is exposed, the exposed lengthwise edges of each of the plurality of planar paperboard sheets and the plurality of fluted paperboard sheets together defining a bundle top surface oriented generally perpendicularly to the planar paperboard sheets and the fluted paperboard sheets and spaced apart from the base surface;
   a separate outer abrasive film placed over and adhered to the bundle top surface.

2. The dulling assembly of claim 1, wherein the separate outer abrasive film includes grains of sand.

3. The dulling assembly of claim 2, wherein the sand is playground sand.

4. The dulling assembly of claim 1, wherein the separate outer abrasive film includes a glue.

5. The dulling assembly of claim 4, wherein the glue is wood glue.

6. The dulling assembly of claim 1, wherein at least some of the plurality of planar paperboard sheets and the plurality of fluted paperboard sheets include E flute corrugated fiberboard.

7. The dulling assembly of claim 1, wherein the planar paperboard sheets and the fluted paperboard sheets each have an arced shape.

8. The dulling assembly of claim 1, wherein the bundle top surface is generally parallel to the base surface.

9. The dulling assembly of claim 1, wherein the base surface is part of a pliable liner.

10. The dulling assembly of claim 1, further comprising at least one insertion rod extending through and aligning the plurality of planar paperboard sheets and the plurality of fluted paperboard sheets.

* * * * *